United States Patent [19]
Hagopian

[11] Patent Number: 5,115,271
[45] Date of Patent: May 19, 1992

[54] CROPPING DEVICE FOR PHOTOGRAPHS AND THE LIKE

[76] Inventor: James C. Hagopian, 915 N. Mansfield Ave., Hollywood, Calif. 90038

[21] Appl. No.: 708,047

[22] Filed: May 30, 1991

[51] Int. Cl.⁵ .............................................. G03B 27/58
[52] U.S. Cl. ...................................... 355/74; 355/126
[58] Field of Search ..................... 355/74, 75, 126, 125

[56] References Cited

U.S. PATENT DOCUMENTS

| | | | |
|---|---|---|---|
| 2,246,920 | 6/1941 | Kromholz | 355/74 |
| 2,702,944 | 3/1955 | Lane et al. | 355/74 |
| 2,995,979 | 8/1961 | Gordon et al. | 355/74 |
| 3,203,334 | 8/1965 | Wilson et al. | |
| 3,709,591 | 1/1973 | Alzmann | 355/74 |
| 4,455,082 | 6/1984 | Lepist | 355/75 |
| 4,460,271 | 7/1984 | Lymperis | 355/74 |
| 4,568,180 | 2/1986 | Kogane | 355/74 |
| 4,645,336 | 2/1987 | Muehlenbruch | 355/74 X |

OTHER PUBLICATIONS

Title: How to Use Cropper Scale (an instruction sheet). 1988 Art Distribution Center, Inc.

Primary Examiner—Richard A. Wintercorn
Attorney, Agent, or Firm—Kelly, Bauersfeld & Lowry

[57] ABSTRACT

A variable photographic cropper for maintaining multiple constant proportions of a visible area includes a pair of masks situated within a housing having a central window. Each mask is capable of rotational and translational movement within the housing, and includes a pair of linear edges which intersect and form a right angle at an apex located at the center of rotation of the respective mask. One of the masks is superimposed over the other such that the linear edges of the masks cooperatively define a variable, generally rectilinear aperture within the housing window. Four cables interconnect the masks to control movement of the masks relative to one another whereby the height-to-width proportions of the rectilinear aperture can be selected, and then the size of the aperture varied without changing the selected proportions. A locking mechanism is provided to selectively fix the masks within the housing to prevent rotational and/or translational movement therein.

20 Claims, 3 Drawing Sheets

CROPPING DEVICE FOR PHOTOGRAPHS AND THE LIKE

BACKGROUND OF THE INVENTION

This invention relates generally to the masking and enlargement of selected portions of photographs and the like. More specifically, the present invention relates to a variable photographic cropping device capable of having both the size and proportions of an aperture adjusted and locked in a selected configuration.

Frequently photographers find it desirable to select only a portion of a print or negative, and to reproduce the selected portion by enlargement. This selection process is referred to as cropping. In the past, enlargements were usually of certain standard dimensions, such as a size and proportion of eight by ten inches. In modern practice, however, the size and proportions of the enlargements can vary widely. To produce an enlargement of a desired size and proportion, it is necessary that the smaller selected area be of the same height-to-width proportions.

It is well known to crop a photograph by employing two L-shaped plates to form a substantially rectangular mask. The two plates are placed upon the print and shifted in relative position until the desired size and shape is obtained. The print is outlined along the inner edge of the positioned plates. The accuracy of this technique in proportioning can be only approximate and is dependent upon the skill and care of the operator. Although this cropping technique may be relatively inaccurate and time-consuming, it is possible to obtain any size and proportion of a selected area.

The accuracy of proportioning the selected area of a print is improved by providing a positive control. In the past, two masks have been provided which each have an aperture with sides and ends of the desired proportion. The print to be cropped is placed in the aperture of one mask and the overlapping mask is guided on tracks along a line joining the apexes of opposite angles of the two masks. A fixed ratio of side-to-end of the selected area of the print is thus maintained. Although this type of prior cropper provides a quick and accurate means for selecting and proportioning an area of a print, it is not possible to select more than one height-to-width proportion. Exemplary of such prior devices is U.S. Pat. No. 2,246,920.

An improved prior cropping device utilizes one mask as a slide positioned within a sheath with two open ends. The sheath forms the other mask. The slide is positively controlled to move in the sheath and in the direction of a line joining opposite corners of apertures in the masks. By moving the slide to adjust the relative position of two like-proportioned corners, one of the slide and one of the sheath, the size of the selected print area may be determined according to one predetermined proportion. A second predetermined proportion may be obtained by removing the slide from the sheath, inverting it, and reinserting it into the sheath. An example of such a device is shown in U.S. Pat. No. 3,709,591.

Although each of these prior devices, and similar related cropping apparatuses, permit the size of the selected print area to be infinitely varied within preset parameters, the height-to-width proportion cannot likewise be varied. Thus, if an unusual print area proportion is desired, many prior devices must be discarded in favor of manually employing two L-shaped plates to form a rectangular mask of the desired proportions.

Accordingly, there has been a need for a novel cropping device for photographs and the like, which provides a substantially rectilinear aperture for overlying a selected print area, which aperture can be selectively adjusted to vary the height-to-width proportions thereof as well as the size of the aperture. Additionally, there exists a need for a cropping device for photographs and the like, which is easily understood and simple to operate, and allows the proportion of the aperture to be pre-selected and fixed, while permitting the size of the aperture to be adjusted. Further, such a cropping device is needed which allows the size of the aperture to be fixed, while permitting the height-to-width proportion thereof to be varied. Such a cropping device should be of a simplified design and construction, permitting economical manufacture of the device. The present invention fulfills these needs and provides other related advantages.

SUMMARY OF THE INVENTION

The present invention resides in an improved cropping device for photographs and the like, which is compact, easy to use, and permits the size and the proportions of an aperture therethrough to be infinitely varied and locked into place within pre-set parameters. The cropping device comprises a housing having a central window and a pair of masks within the housing, each being capable of rotational and translational movement therein. The masks cooperatively define a variable, generally rectilinear aperture within the housing window. Means are provided for coordinating and controlling rotational and translational movement of the masks within the housing, whereby the height-to-width proportions of the rectilinear aperture can be selected, and then the size of the rectilinear aperture varied, without changing the selected proportion.

In a preferred form of the invention, each mask includes a pair of linear edges which intersect and form a right angle at an apex located at the center of rotation of the respective mask. A first mask is superimposed over a second mask such that the linear edges of the masks cooperatively define the generally rectilinear aperture. Each mask further includes four spaced-apart anchors located adjacent to the outer periphery of the mask, which anchors form a portion of the coordinating and controlling means.

The means for coordinating and controlling rotational and translational movement of the masks within the housing, includes means for connecting the first mask and the second mask together such that rotation of one of the masks results in rotation of the other mask to vary the height-to-width proportions of the rectilinear aperture. The coordinating and controlling means further includes means for connecting the first mask and the second mask together such that translational movement of one of the masks results in translational movement of the other mask to vary the size of the rectilinear aperture without changing the proportions thereof. These means for connecting the first and second masks together comprise four cables, each having opposite ends positioned within selected anchors provided in, respectively, the first mask and the second mask. The cables extend peripherally about the masks such that each cable has a companion cable of substantially equal length which symmetrically but oppositely connects the first mask to the second mask.

Each mask includes a peripheral channel for guiding the cables about the periphery of the mask. The housing further includes first and second roller means opposite to the mask leading edges, such that the cables each extend from an anchor in the first mask, through a portion of the peripheral channel of the first mask, around one of the first or second roller means, into a portion of the peripheral channel of the second mask, and finally to an anchor in the second mask. The first and second roller means each include at least two rollers fixed within respective corners of the housing.

The cropping device additionally includes means for selectively locking the masks in a selected configuration within the housing to prevent rotational and/or translational movement therein. The locking means includes means for selectively preventing rotation of the masks within the housing to fix the height-to-width proportions of the rectilinear aperture, while permitting translational movement of the masks within the housing that vary the size of the rectilinear aperture. Conversely, the locking means also includes means for selectively preventing translational movement of the masks within the housing to fix the size of the rectilinear aperture, while permitting rotational movement of the masks within the housing to vary the height-to-width proportions of the rectilinear aperture. A mechanical locking mechanism which frictionally engages the masks and a portion of the housing provides these functions.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
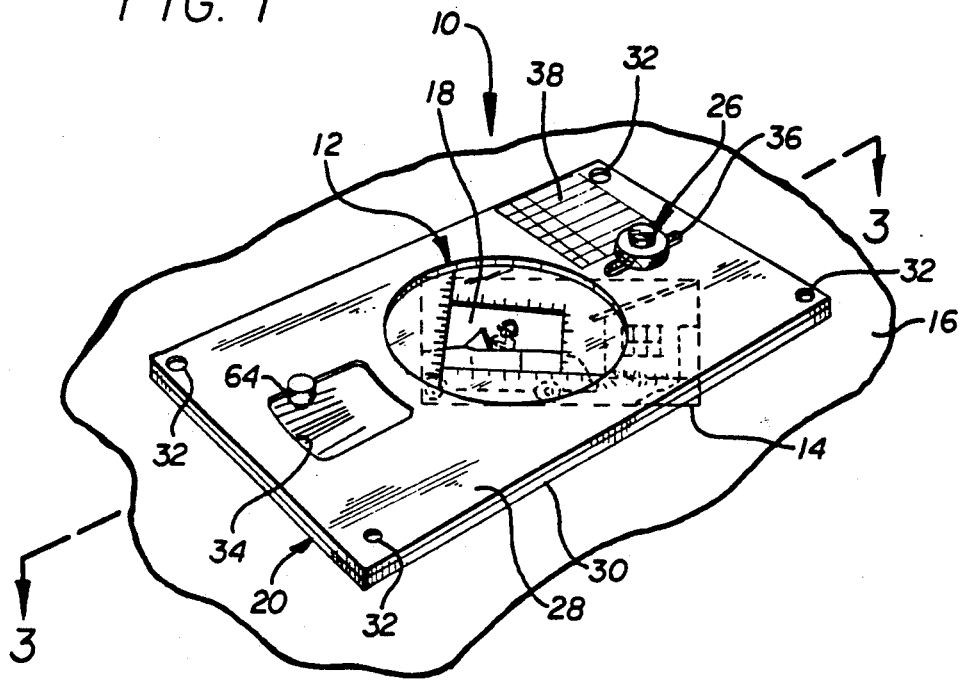
FIG. 1 is a perspective view of a cropper for photographs embodying the invention, illustrated in use upon a planar surface wherein a photograph is shown between the cropper and the surface in phantom.

As shown in the drawings for purposes of illustration, the present invention is concerned with an improved cropping device for photographs and the like, generally designated in the accompanying drawings by the reference number 10. The cropper 10 includes a window 12 which is typically placed over a photograph 14 or the like lying upon an underlying planar surface 16. The cropper 10 provides means for masking off all but a selected print area 18 of the photograph 14 within the window 12. The cropper 10 permits the size and the height-to-width proportions of the selected print area 18 to be infinitely varied within the parameters established by the window 12.

Figure 2:
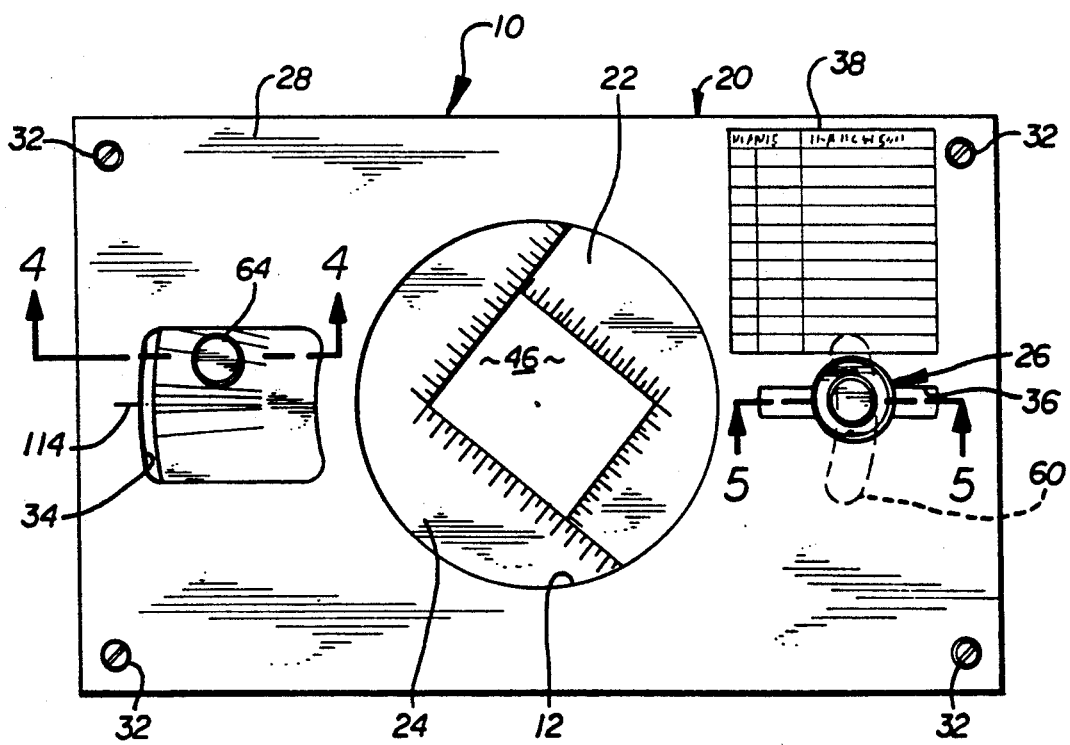
FIG. 2 is an enlarged top plan view of the cropper shown in FIG. 1.

In accordance with the present invention, and with reference to FIGS. 1 and 2, the cropper 10 comprises, generally, a housing 20 having a large central aperture therethrough forming the window 12, a pair of masks 22 and 24 disposed within the housing, wherein each mask is capable of rotational and translational movement therein, and means for coordinating and controlling rotational and translational movement of the first mask 22 relative to the second mask 24. Additionally, a locking mechanism 26 is provided for selectively locking the masks 22 and 24 in a selected configuration within the housing 20 to prevent rotational and/or translational movement thereof.

The housing 20 includes a rectangular housing upper shell 28 and a similar lower shell 30. The upper and lower housing shells 28 and 30 are attached to one another by means of nut and bolt attachments 32 located generally adjacent to each corner of the housing 20. The upper housing shell 28 further includes a proportion scale window 34 on one side of the window 12, and a linear slot 36 on the other side of the window 12. The slot 36 is positioned to coincide with the longitudinal axis of the cropper 10, and houses a portion of the locking mechanism 26. The upper shell 28 may further include a table for a proportion scale, such as that schematically illustrated in FIGS. 1 and 2 and given the reference number 38, but such a table is not required for purposes of the present invention.

Figure 3:
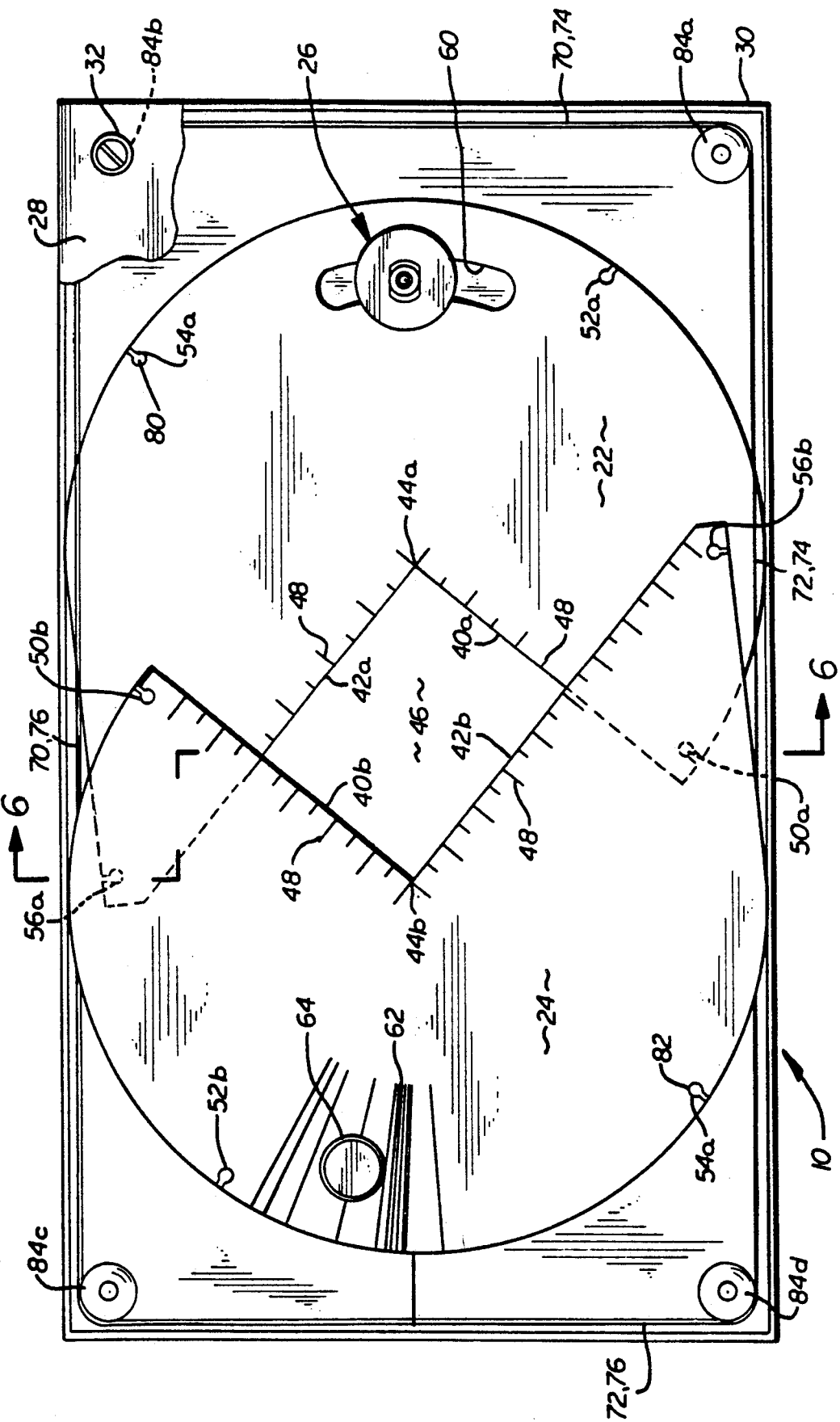
FIG. 3 is n enlarged top plan view of the cropper taken generally along the line 3—3 of FIG. 1, illustrated with an upper housing section and a portion of the locking mechanism removed.
Figure 4:
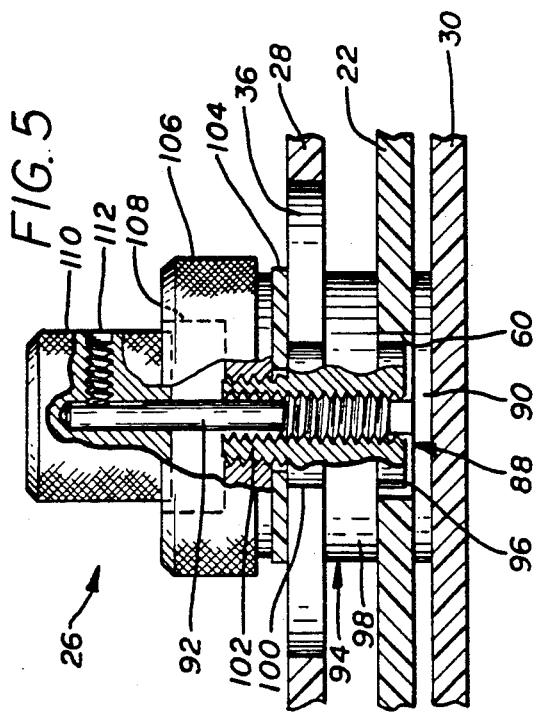
FIG. 4 is an enlarged fragmented vertical section taken generally along the line 4—4 of FIG. 2, illustrating a portion of a mask visible through a proportional scale window, and a roller supported within the for guiding a pair of cables.

With reference to FIGS. 3 and 4, the masks 22 and 24 are substantially identical to one another. Each mask includes a pair of linear edges 40 and 42 which intersect and form a right angle at an apex 44 located at the center of rotation of the respective mask. The second mask 24 is rotated 180° relative to the first mask 22, and is superimposed over the first mask such that the linear edges 40 and 42 of the masks cooperatively define a variable, generally rectilinear aperture 46 within the parameters established by the window 12. Like the slot 36 of the housing 20, the apexes 44 of the masks 22 and 24 are positioned along the longitudinal axis of the cropper 10. Scales 48 are printed upon each mask 22 and 24 adjacent to the linear edges 40 and 42.

Each mask 22 and 24 further includes four anchor apertures 50, 52, 54 and 56 situated adjacent to the outer periphery of the masks. A channel 58 (FIG. 6) extends within the edge of each mask from the first anchor aperture 50 away from the first linear edge 40, around the periphery of the respective mask to the fourth anchor aperture 56 adjacent to the second linear edge 42. The first mask 22 further includes a curvilinear slot 60 which generally underlies the linear slot 36. A portion of the locking mechanism 26 extends through both slots 36 and 60.

For purposes of the following description of a preferred embodiment of the invention, elements common to each of the masks 22 and 24 will be given the same reference number. Where necessary for purposes of clarity, those elements associated with the first mask will include the letter "a", i.e 22a and those elements associated with the second mask 24 will include the letter "b", i.e., 24b.

The second mask 24 includes a series of radially extending lines generally opposite the apex 44b, which form a proportion index 62. This index 62 is visible through the proportion scale window 34 of the housing 20, and may include appropriate markings to permit comparison with the table 38. A proportional knob 64 is fixed to the second mask 24 in the center of the proportion index 62 by means of a screw 66 to facilitate adjusting the height-to-width proportions of the rectilinear aperture 46. As shown, the proportional knob 64 is accessible through the proportion scale window 34. Underlying the proportional knob 64 is a spacer 68 fixed to the underside of the second mask 24 by the screw 66. The spacer 68 slides over an interior surface of the housing lower shell 30 as the second mask 24 is moved within the housing 20, and maintains the overlying portion of the second mask 24 in its proper configuration within the housing (FIG. 4).

The masks 22 and 24 are connected to one another within the housing 20 such that rotation of one of the masks results in rotation of the other mask to vary the height-to-width proportions of the rectilinear aperture 46. The masks 22 and 24 are further connected together such that translational movement of one of the masks results in translational movement of the other mask to vary the size of the rectilinear aperture 46 without changing the proportions thereof. This is accomplished by means of interconnecting the masks 22 and 24 with four cables 70, 72, 74 and 76. The cables may be constructed of any flexible, nonelastic material, and each includes a cylindrical body portion 78, a first anchor attachment 80 at one end, and a second anchor attachment 82 at the other end. The anchor attachments 80 and 82 are configured for reception and securement within the anchor apertures 50, 52, 54 and 56 of the masks 22 and 24. Each of cables 70, 72, 74 and 76 are positioned such that the first anchor attachment 80 is situated within a respective anchor aperture of the first mask, and the second anchor attachment 82 is situated within a respective anchor aperture of the second mask 24. The cables extend peripherally about the masks 22 and 24 such that each cable has a companion cable of substantially equal length which symmetrically but oppositely connects the first mask to the second mask. The cables are guided through the channels 58 provided in the peripheral surface of the masks 22 and 24, and about four rollers 84a-d which rotate about the bolts 32 fixing the housing upper shell 28 to the lower shell 30. Each of these rollers 84 include a washer 86 which provides means for positively separating two cables placed over the roller.

Figure 6:
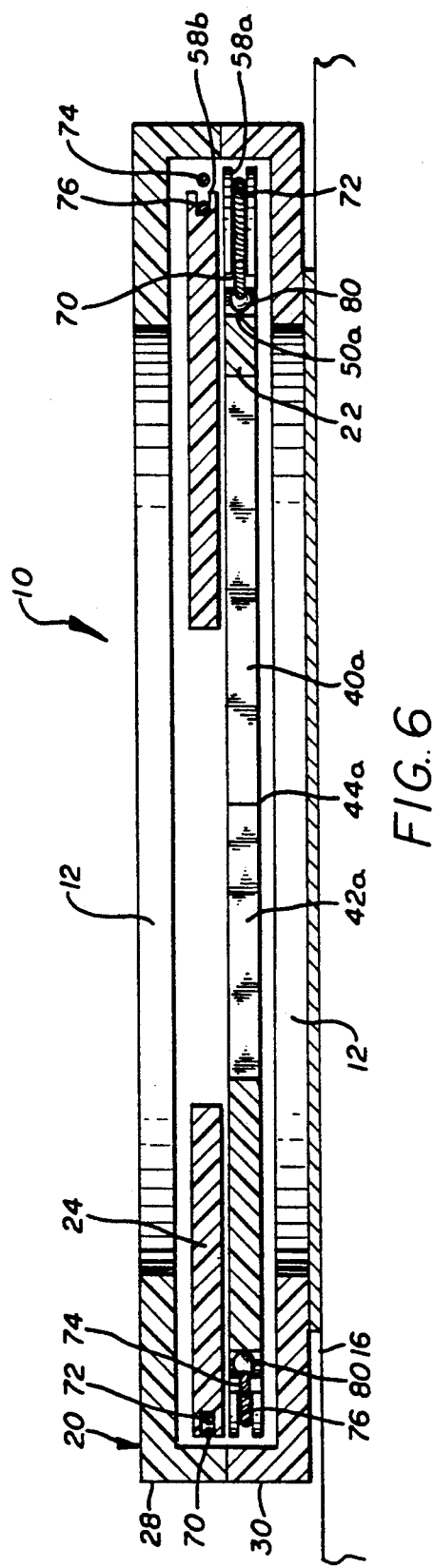
FIG. 6 is an enlarged vertical section taken generally along the line 6—6 of FIG. 3, illustrating the manner in which the cables are anchored adjacent to the periphery of the masks.

As shown best in FIGS. 3, 4 and 6, the first cable 70 has its first anchor attachment 80 situated within the first anchor aperture 50a of the first mask 22. The first cable 70 extends from there through a portion of the channel 58a, about the roller 84a to the roller 84b. The cable 70 is then directed into the channel 58b of the mask 24, wherein the second anchor attachment 82 is situated within the second anchor aperture 52b of the second mask 24. Similarly, but in a manner symmetrically opposite to the first cable 70, the second cable 72 has its first anchor attachment 80 secured within the second anchor aperture 52a of the first mask 22. The second cable 72 extends through the channel 58a to the roller 84d and then to the roller 84c, and from thence to a portion of the channel 58b. The second anchor attachment 82 of the second cable 72 is then secured within the first anchor aperture 50b of the second mask 24.

The first anchor attachment 80 of the third cable 74 is situated within the fourth anchor aperture 56a of the first mask 22 and extends from the channel 58a to the roller 84b. From the roller 84b, the third cable 74 extends around the roller 84a into the channel 58b of the second mask 24. The second anchor attachment 82 of the third cable 74 is secured within the third anchor aperture 54b of the second mask 24. Similarly, but in a symmetrically opposite manner in comparison with the third cable 74, the fourth cable 76 has its first anchor attachment 80 secured within the third anchor aperture 54a of the first mask 22. The cable 76 extends through the channel 58a, about the roller 84c to the roller 84d. The fourth cable 76 then extends into the channel 58b of the second mask 24 to the fourth anchor aperture 56b of the second mask 24.

These cables 70, 72, 74 and 76, when so attached to the masks 22 and 24 and routed through the housing 20, ensure that translational and rotational motion imparted to one of the masks is simultaneously met with a similar but opposite translational and/or rotational motion of the other mask. This has the effect of maintaining a rectilinear aperture 46 within the window 12, permits rotation of the masks to vary the height-to-width proportions of the rectilinear aperture, and further allows translational movement of the masks to vary the size of the rectilinear aperture without changing the proportions thereof. The size and the proportions of the rectilinear aperture 46 are limited solely by the translational movement of the locking mechanism 26 through the linear slot 36 in the housing 20, and the rotational motion of the masks 22 and 24 as limited by movement of the proportional knob 64 within the proportion scale window 34.

Figure 5:
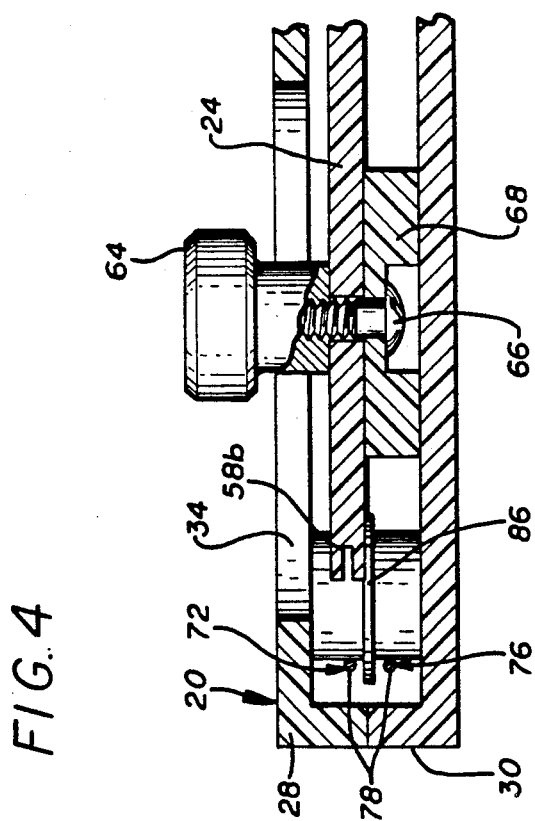
FIG. 5 is an enlarged, fragmented and partially sectional view taken generally along the line 5—5 of FIG. 2, illustrating the components of the locking mechanism.

With reference now to FIG. 5, the locking mechanism 26 provides means for selectively preventing rotation of the masks 22 and 24 within the housing 20 to fix the height-to-width proportions of the rectilinear aperture 46, while permitting translational movement of the masks within the housing to vary the size of the rectilinear aperture. Alternatively, the locking mechanism 26 provides means for selectively preventing translational movement of the masks within the housing to fix the size of the rectilinear aperture, while permitting rotational movement of the masks within the housing to vary the height-to-width proportions of the rectilinear aperture.

To accomplish these features, the locking mechanism 26 includes a base 88 having a lower flange 90 disposed between the underside of the first mask 22 and an upper surface of the lower housing shell 30, and an upwardly extending shaft 92. The shaft 92 extends upwardly through both the curvilinear slot 60 provided through the first mask 22, and the linear slot 36 through the upper housing shell 28. A sleeve 94 having a reverse internal thread is threaded onto the shaft 92 such that a lower end of the sleeve 94 is positioned generally adjacent to the lower flange 90. The sleeve 94 includes a lower section 96 closely dimensioned to slide within the curvilinear slot 60, an intermediate portion 98 of sufficient size to be incapable of passing through either of the slots 60 or 36, an upper portion 100 closely dimensioned to slide within the linear slot 36, and an exteriorly threaded nipple 102 which extends upwardly from the upper portion 100 above the housing 20. The intermediate portion 98 is disposed between the undersurface of the housing upper shell 28, and the upper surface of the first mask 22.

A washer 104 is placed over the nipple 102 of the sleeve 94 and rests over the housing upper shell 28. A lower knob 106, having an interior recess 108, is threaded onto the nipple 102 so that a lower surface thereof is placed generally adjacent to the washer 104. An upper knob 110 is placed over the upper extreme end of the shaft 92 and fixed to the shaft 92 of the base 88 by means of a set screw 112.

The locking mechanism 26 illustrated in the accompanying drawings advantageously utilizes the interconnections between the masks 22 and 24 to control rotational and translational movement of each while engaging only one of the masks 22. The upper knob 110 is tightened to fix the rotational position of the masks 22 and 24 relative to the housing to thereby fix the height-to-width proportions of the rectilinear aperture 46. When the upper knob 110 is turned clockwise, the locking mechanism base 88 is drawn upwardly into the sleeve 94. This has the effect of squeezing a portion of the first mask 22 surrounding the curvilinear slot 60 between the lower flange 90 and the intermediate portion 98, thereby preventing further movement of the first mask 22 relative to the locking mechanism 26. This does not, however, prevent the size of the rectilinear aperture 46 from being varied by movement of the locking mechanism 26 through the linear slot 36 of the housing 20.

In a similar manner the size of the rectilinear aperture can be fixed by turning the lower knob 106. When turning the lower knob 106 in a clockwise direction, the sleeve 94 is drawn upwardly to squeeze a portion of the housing upper shell 28 between the washer 104 and the intermediate portion 98 of the sleeve 94. When the lower knob 106 is so tightened, translational movement of the masks 22 and 24 is prevented, thus fixing the size of the rectilinear aperture 46.

It is not necessary that the upper knob 110 be first tightened to fix the proportions of the rectilinear aperture prior to tightening the lower knob 106 to fix the size. If desired, the size of the rectilinear aperture 46 can first be fixed by tightening the lower knob 106, while permitting pivotal movement of the masks 22 and 24 relative to the locking mechanism 26.

In use, the cropping device 10 is typically placed over a photograph 14 so that the prospective selected print area 18 is seen through the window 12. If the user already knows what the desired height-to-width proportions of the enlargement will be, those proportions can be set by aligning an appropriate line of the proportion index 62 with an index line 114 provided on the housing 20, utilizing the proportional knob 64. When the rectilinear aperture 46 is configured as desired, the upper knob 110 is turned clockwise to prevent movement of the locking mechanism 26 through the curvilinear slot 60 of the first mask 22. This effectively locks-in the selected proportions of the rectilinear aperture 46. The locking mechanism 26 may then be grasped and moved through the length of the linear slot 36 to vary the size of the rectilinear aperture 46. When a size is selected, the lower knob 106 is tightened to prevent further movement of the masks 22 and 24 within the housing 20. The selected print area 18 may then be suitably marked for enlargement.

From the foregoing it is to be appreciated that the cropping device 10 of the present invention provides a mechanism whereby the height-to-width proportions, as well as the size of a rectilinear aperture can be simply and easily varied to suit the circumstances presented. The proportions of the rectilinear aperture 46 can be fixed while manipulating the masks 22 and 24 to vary the size thereof, and conversely the size of the rectilinear aperture can be fixed while varying the proportions thereof. The cropper 10 of the present invention is of simplified construction and easy to use.

Although a particular embodiment of the invention has been described in detail for purposes of illustration, various modifications may be made without departing from the spirit and scope of the invention. Accordingly, the invention is not to be limited, except as by the appended claims.

I claim:

1. A cropping device for photographs and the like, comprising:
    a housing having a central window;
    a first mask within the housing, capable of rotational and translational movement therein;
    a second mask within the housing, capable of rotational and translational movement therein, the first mask and the second mask cooperatively defining a variable, generally rectilinear aperture within the housing window; and
    means for coordinating and controlling movement of the first mask relative to the second mask, whereby the proportions of the rectilinear aperture can be selected, and then the size of the rectilinear aperture varied without changing the selected proportions.

2. A cropping device as set forth in claim 1, including means for selectively locking the masks in a selected configuration within the housing to prevent rotational and/or translational movement therein.

3. A cropping device as set forth in claim 2, wherein the locking means includes means for selectively preventing rotation of the masks within the housing to fix the height-to-width proportions of the rectilinear aperture, while permitting translational movement of the masks within the housing to vary the size of the rectilinear aperture.

4. A cropping device as set forth in claim 2, wherein the locking means includes means for selectively preventing translational movement of the masks within the housing to fix the size of the rectilinear aperture, while permitting rotational movement of the masks within the housing to vary the height-to-width proportions of the rectilinear aperture.

5. A cropping device as set forth in claim 1, wherein each mask includes a pair of linear edges which intersect and form a right angle at an apex located at the center of rotation of the respective mask, the second mask being superimposed over the first mask such that the linear edges of the masks cooperatively define the generally rectilinear aperture.

6. A cropping device as set forth in claim 1, wherein the means for coordinating and controlling movement of the masks includes cable means for connecting the first mask and the second mask together such that rotation of one of the masks results in rotation of the other mask to vary the height-to-width proportions of the rectilinear aperture, and for connecting the first mask and the second mask together such that translational movement of one of the masks results in translational movement of the other mask to vary the size of the rectilinear aperture without changing the proportions thereof.

7. A cropping device as set forth in claim 5, wherein each mask includes four spaced anchors located adjacent to the outer periphery of the respective mask, and wherein the means for coordinating and controlling movement of the masks includes four cables each having opposite ends positioned within selected anchors provided in, respectively, the first mask and the second mask, the cables extending peripherally about the masks such that each cable has a companion cable of substantially equal length which symmetrically but oppositely connects the first mask to the second mask.

8. A cropping device as set forth in claim 7, wherein each mask includes a peripheral channel for guiding the cables about the periphery of the masks, and wherein the housing includes first and second roller means opposite to the mask leading edges, such that the cables each extend from an anchor in the first mask, through a portion of the peripheral channel of the first mask, around one of the first or second roller means, into a portion of the peripheral channel of the second mask, and finally to an anchor in the second mask.

9. A cropping device as set forth in claim 8, wherein the first and second roller means each include at least two rollers fixed within respective corners of the housing.

10. A variable photographic cropper for maintaining multiple constant proportions of a visible area, the cropper comprising:
- a first mask capable of rotational and translational movement, including a first linear edge and a second linear edge which intersect at a right angle;
- a second mask capable of rotational and translational movement, including a third linear edge and a fourth linear edge which intersect at a right angle, a portion of the second mask being superimposed over the first mask such that the first, second, third and fourth linear edges define a variable, generally rectilinear aperture;
- means for connecting the first mask and the second mask together such that rotation of one of the masks results in rotation of the other mask to vary the height-to-width proportions of the rectilinear aperture; and
- means for connecting the first mask and the second mask together such that translational movement of one of the masks results in translational movement of the other mask to vary the size of the rectilinear aperture without changing the proportions thereof.

11. A variable photographic cropper as set forth in claim 10, wherein each mask includes four spaced anchors located adjacent to the outer periphery of the respective mask, and four cables are provided for connecting the first mask and second mask together, each cable having opposite ends positioned within selected anchors provided in, respectively, the first mask and the second mask, the cables extending peripherally about the masks such that each cable has a companion cable of substantially equal length which symmetrically but oppositely connects the first mask to the second mask.

12. A variable photographic cropper as set forth in claim 11, wherein each mask includes a peripheral channel for guiding the cables about the periphery of the masks, and wherein first and second roller means are provided such that the cables each extend from an anchor in the first mask, through a portion of the peripheral channel of the first mask, around one of the roller means, into a portion of the peripheral channel of the second mask, and finally to an anchor in the second mask.

13. A variable photographic cropper as set forth in claim 12, wherein the first and second roller means each include at least two rollers fixed within a housing for the masks, at respective corners of the housing.

14. A variable photographic cropper as set forth in claim 10, including means for selectively locking the masks in a selected configuration to prevent rotational and/or translational movement thereof.

15. A variable photographic cropper as set forth in claim 14, including a housing in which the masks are situated, the locking means including means for selectively preventing rotation of the masks within the housing to fix the height-to-width proportions of the rectilinear aperture, while permitting translational movement of the masks within the housing to vary the size of the rectilinear aperture, and wherein the locking means includes means for selectively preventing translational movement of the masks within the housing to fix the size of the rectilinear aperture, while permitting rotational movement of the masks within the housing to vary the height-to-width proportions of the rectilinear aperture.

16. A cropping device for photographs and the like, comprising:
- a housing having a central window;
- a first mask within the housing capable of rotational and translational movement therein, a second mask within the housing capable of rotational and translational movement therein, wherein each mask includes a pair of linear edges which intersect and form a right angle at an apex located at the center of rotation of the respective mask, the second mask being superimposed over the first mask such that the linear edges of the masks cooperatively define a variable, generally rectilinear aperture within the housing window;
- means for connecting the first and the second masks together such that rotation of one of the masks results in rotation of the other mask to vary the height-to-width proportions of the rectilinear aperture;
- means for connecting the first and the second masks together such that translational movement of one of the masks results in translational movement of the other mask to vary the size of the rectilinear aperture without changing the proportions thereof; and
- means for locking the masks in a selected configuration within the housing to prevent rotational and/or translational movement therein.

17. A cropping device as set forth in claim 16, wherein the locking means includes means for selectively preventing rotation of the masks within the housing to fix the height-to-width proportions of the rectilinear aperture, while permitting translational movement of the masks within the housing to vary the size of the rectilinear aperture.

18. A cropping device as set forth in claim 16, wherein the locking means includes means for selectively preventing translational movement of the masks within the housing to fix the size of the rectilinear aperture, while permitting rotational movement of the masks within the housing to vary the height-to-width proportions of the rectilinear aperture.

19. A cropping device as set forth in claim 16, wherein each mask includes four spaced anchors located adjacent to the outer periphery of the respective mask, and four cables are provided for connecting the first mask and the second mask together, each cable having opposite ends positioned within selected anchors provided in, respectively, the first and the second masks, the cables extending peripherally about the masks such that each cable has a companion cable of substantially equal length which symmetrically but oppositely connects the first mask to the second mask.

20. A cropping device as set forth in claim 19, wherein each mask includes a peripheral channel for guiding the cables about the periphery of the masks, and wherein first and second roller means are provided such that the cables each extend from an anchor in the first mask, through a portion of the peripheral channel of the first mask, around one of the roller means, into a portion of the peripheral channel of the second mask, and finally to an anchor in the second mask.

* * * * *

UNITED STATES PATENT AND TRADEMARK OFFICE
CERTIFICATE OF CORRECTION

PATENT NO. : 5,115,271
DATED : May 19, 1992
INVENTOR(S) : James C. Hagopian

It is certified that error appears in the above-identified patent and that said Letters Patent is hereby corrected as shown below:

In column 3, line 44, delete "n" and insert therefor --an--.

In column 3, line 51, after "the" insert "housing".

Signed and Sealed this

Sixth Day of July, 1993

Attest:

MICHAEL K. KIRK

*Attesting Officer*  *Acting Commissioner of Patents and Trademarks*